(12) United States Patent
Cai et al.

(10) Patent No.: US 7,940,904 B2
(45) Date of Patent: May 10, 2011

(54) CONVERGED OFFLINE CHARGING AND ONLINE CHARGING

(75) Inventors: Yigang Cai, Naperville, IL (US); Xiang Yang Li, Beijing (CN); Peng Wang, Beijing (CN); Jay Z. Zhao, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1413 days.

(21) Appl. No.: 11/190,731

(22) Filed: Jul. 27, 2005

(65) Prior Publication Data

US 2007/0036312 A1 Feb. 15, 2007

(30) Foreign Application Priority Data

Jun. 24, 2005 (CN) .......................... 2005 1 0079123

(51) Int. Cl.
*H04M 15/00* (2006.01)
*H04M 11/00* (2006.01)
(52) U.S. Cl. ............... 379/114.28; 379/114.26; 455/406
(58) Field of Classification Search ............ 379/114.01, 379/114.03, 114.28, 115.01, 115.03, 126; 455/405–408
See application file for complete search history.

(56) References Cited

U.S. PATENT DOCUMENTS

| 7,010,104 B1 * | 3/2006 | Cai et al. ....................... 379/126 |
| 2003/0130914 A1 * | 7/2003 | Cinotti et al. ................... 705/34 |
| 2006/0153074 A1 * | 7/2006 | Hurtta et al. ................... 370/230 |

FOREIGN PATENT DOCUMENTS

EP 1492321 A1 12/2004

OTHER PUBLICATIONS

"3rd Generation Partnership Project; Technical Specification Group Services and System Aspects; Telecommunication Management; Charging Management; Charging Architecture and Principles", 3GPP TS 32.240, Release 6 (Sep. 2004).

"3rd Generation Partnership Project; Technical Specification Group Services and System Aspects; Telecommunication Management; Charging Management; Diameter Charging Applications", 3GPP TS 32.299, Release 6 (Sep. 2004).

* cited by examiner

*Primary Examiner* — Quoc D Tran
(74) *Attorney, Agent, or Firm* — Duft Bornsen & Fishman LLP

(57) ABSTRACT

Converged charging systems and methods are described. A converged charging system includes an offline charging system, an online charging system, a common rating function, and a common charging gateway function. When in operation, the online charging system receives online charging information for a first call and accesses the common rating function to determine a rating for the first call. The online charging system then transmits a rated charging data record (CDR) for the first call to the common charging gateway function. The offline charging system receives offline charging information for a second call, and accesses the common rating function to determine a rating for the second call. The offline charging system transmits a rated CDR for the second call to the common charging gateway function. The common charging gateway function buffers the rated CDRs for both online and offline calls, and then transmits the rated CDRs to a billing system.

10 Claims, 12 Drawing Sheets

US 7,940,904 B2

CONVERGED OFFLINE CHARGING AND ONLINE CHARGING

RELATED APPLICATIONS

This patent application claims priority to a foreign patent application filed in the Chinese Patent Office, having the application number 200510079123.X and filed on Jun. 24, 2005.

BACKGROUND OF THE INVENTION

1. Field of the Invention

The invention is related to the field of communications, and in particular, to converged charging systems and corresponding methods for converging offline charging and online charging in communication networks.

2. Statement of the Problem

The $3^{rd}$ Generation Partnership Project (3GPP) standard group has defined a set of specifications about online charging systems and offline charging systems to cover charging in the various network domains (i.e., a circuit switching network domain, a packet switching network domain, or a wireless domain), IP multimedia subsystems, and emerging 3G application services. However, the online charging specification and the offline charging specification are defined in a separate way and operate in a separate manner.

FIG. 1 illustrates a charging architecture 100 as defined by the 3GPP. The charging architecture 100 may be found in the technical specification 3GPP TS 32.240. The left part of FIG. 1 illustrates the offline charging system 102 of the charging architecture 100. Offline charging system 102 includes a Charging Data Function (CDF) 110 and a Charging Gateway Function (CGF) 112. The right part of the FIG. 1 illustrates the online charging system (OCS) 104 of the charging architecture 100. The detailed functional components of online charging system 104 may be found in the technical specification 3GPP TS 32.296. Offline charging system 102 and online charging system 104 are both operable to transmit charging data records (CDR) to a billing system 106. Offline charging is generally defined as a charging mechanism where charging information does not affect, in real-time, the service rendered. Online charging is generally defined as a charging mechanism where charging information can affect, in real-time, the service rendered, and therefore a direct interaction of the charging mechanism with session/service control is needed.

Offline charging system 102 communicates with the following elements or functions to receive charging information: a circuit-switched network element (CS-NE) 121, a service network element (service-NE) 122, a SIP application server (AS) 123, Multimedia Resource Function Control (MRFC) 124, Media Gateway Control Function (MGCF) 125, Break out Gateway Control Function (BGCF) 126, Proxy-Call Session Control Function (CSCF)/Interrogate-CSCF (I-CSCF) 127, Serving-CSCF (S-CSCF) 128, Wireless LAN (WLAN) 129, SGSN 130, GGSN, 131, and Traffic Plane Function (TPF) 132. These elements and functions are known to those familiar with the 3GPP specifications. Online charging system 104 communicates with the following elements or functions to receive charging information: circuit-switched network element (CS-NE) 121, service network element (service-NE) 122, SIP application server 123, MRFC 124, S-CSCF 128, Wireless LAN (WLAN) 129, SGSN 130, GGSN, 131, and Traffic Plane Function (TPF) 132. These elements and functions are known to those familiar with the 3GPP specifications.

FIG. 2 illustrates online charging system 104 as defined by the 3GPP. Online charging system 104 includes Online Charging Functions (OCF) 202. Online charging functions 202 include Session-Based Charging Function 204 and Event-Based Charging Function 206. Online charging system 104 further includes an Account Balance Management Function (ABMF) 208, an online Rating Function (RF) 210, and a Charging Gateway Function (CGF) 212.

FIG. 3 illustrates a generalization of the charging architecture 100 as defined by the 3GPP to show the operation of the charging architecture 100. Charging architecture 100 includes a Charging Trigger Function (CTF) 302, offline charging system 102, online charging system (OCS) 104, and billing system 106. Both offline charging system 102 and online charging system (OCS) 104 introduce a charging gateway function, which are charging gateway function (CGF) 112 and charging gateway function (CGF) 212, respectively. Charging gateway function 112 and charging gateway function 212 act as a gateway between the network and the billing system 106 to provide the CDR pre-processing functionality. Offline charging system 102 includes a charging data function (CDF) 110 and charging gateway function 112. Online charging system 104 includes online charging function (OCF) 202, account balance management function (ABMF) 208, an online rating function (RF) 210, and charging gateway function 212. Billing system 106 includes offline rating function (RF) 304.

According to the 3GPP standards, the charging trigger function 302 is the focal point for collecting the information pertaining to chargeable events within a network element (not shown). The charging trigger function 302 in one or more network elements generates charging information for one or more calls. Depending on subscriber provisioned charging characteristics, a charging trigger function 302 transmits offline charging information to the charging data function 110 via Rf interface 310. A charging trigger function 302 transmits online charging information to online charging system 104 via Ro interface 311.

For offline charging, the charging data function 110 receives the offline charging information for a call or a call session. The charging data function 110 generates a charging data record (CDR) based on the offline charging information. The CDR is unrated at this point. The charging data function 110 transmits the unrated CDR to charging gateway function 112 via Ga interface 312. Charging gateway function 112 preprocesses the unrated CDR, such as for validation, consolidation, error-handling, etc, and filters the unrated CDR. Charging gateway function 112 also temporarily buffers the unrated CDR. Responsive to a request from billing system 106, charging gateway function 112 transmits the unrated CDR to billing system 106 via Bx interface 313. Billing system 106 includes an offline rating function 304 for determining the rate for offline charging of calls. Billing system 106 accesses the offline rating function 304 to determine a rate for the unrated CDR, and generates a rated CDR for the offline charging of the call session.

For online charging, online charging function 202 includes session-based charging function 204 and event based charging function 206 (see FIG. 2). Each function contains a charging data function to generate CDRs. An online charging function 202 (or its corresponding charging data function) receives online charging information from a charging trigger function 302 for a call session. Responsive to the online charging information, online charging function 202 accesses online rating function 210 to determine a rate for the call session associated with the online charging information. The online charging function 202 generates a rated CDR based on the rate for the call session and the online charging information, and transmits the rated CDR to charging gateway function 212 for CDR pre-processing via Ga interface 314. Charging gateway function 212 preprocesses the CDRs and filters the preprocessed CDRs. Charging gateway function 212 temporarily buffers the rated CDR. Responsive to a request from billing system 106, charging gateway function 112 transmits the rated CDR to billing system 106 via Bo interface 315.

One problem is that the existing 3GPP standard specifications do not describe a convergence between online charging and offline charging. The 3GPP only defines the specification that enables the charging gateway function 112 for the offline charging system 102 to feed an unrated CDR to the billing system 106 via Bx interface 313. The "x" of the Bx interface 313 may be a "c", "p", "i", "l", "m", "o", "w", etc, depending on the network domain. For instance, "c" represents Circuit Switched (CS), "p" represents Packet Switched (PS), "i" represents IP Multimedia Subsystem (IMS), "l" represents Location Service, "m" represents Multimedia Message Service (MMS), "o" represents Online Charging System (OCS), and "w" represents Wireless LAN (WLAN). The billing system 106 thus needs its own independent offline rating function 304 in order to rate offline charges for calls. On the other hand, online charging system 104 includes its own online rating function 210 that rates online charging for calls.

The 3GPP does not define an interface to enable the charging gateway function 112 for the offline charging system 102 to feed CDRs to online charging system 104 for further rating and balance adjustment. Thus, most service operators need to manage, support, maintain, and update two separate charging systems from different vendors. The operational inefficiencies and technical overhead of maintaining two separate charging systems may lead to the service provider's drawback in marketing and business activities.

SUMMARY OF THE SOLUTION

The invention solves the above and other related problems by converging online charging and offline charging into a converged charging system. The converged charging system uses a common rating function for rating both online calls and offline calls. The converged charging system also uses a common charging gateway function. By using a common rating function for both online and offline calls, a billing system doesn't need to maintain a separate rating function to calculate call charges for offline calls. The converged charging system of the invention is used for both online and offline calls, thus achieving charging convergence, which reduces service provider investment, operation, and maintenance cost, and enhances end user service experience. The billing system is only required to store a billing database in order to generate monthly invoices, statistical reports, etc.

One embodiment of the invention comprises a converged charging system connected to a communication network and a billing system. The converged charging system includes an offline charging system, an online charging system, a common rating function, and a common charging gateway function. When in operation, the online charging system receives online charging information for a first call. The online charging system receives the online charging information from a charging trigger function operating on a node handling the first call in the communication network. The online charging system accesses the common rating function to determine a rating for the first call. The online charging system generates a rated charging data record (CDR) for the first call based on the online charging information and the rating for the first call as provided by the common rating function. The online charging system transmits the rated CDR to the common charging gateway function, and the common charging gateway function buffers the rated CDR for the first call.

The offline charging system receives offline charging information for a second call. One of the offline charging system or the online charging system accesses the common rating function to determine a rating for the second call. One of the offline charging system or the online charging system generates a rated CDR for the second call based on the offline charging information and the rating for the second call. One of the offline charging system or the online charging system transmits the rated CDR to the common charging gateway function, and the common charging gateway function buffers the rated CDR for the second call.

The common charging gateway function transmits the rated CDRs to the billing system. The common charging gateway function may transmit the rated CDRs to the billing system periodically or responsive to a request from the billing system.

The invention may include other exemplary embodiments described below.

DESCRIPTION OF THE DRAWINGS

The same reference number represents the same element on all drawings.

DETAILED DESCRIPTION OF THE INVENTION

FIGS. 4-12 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 4:
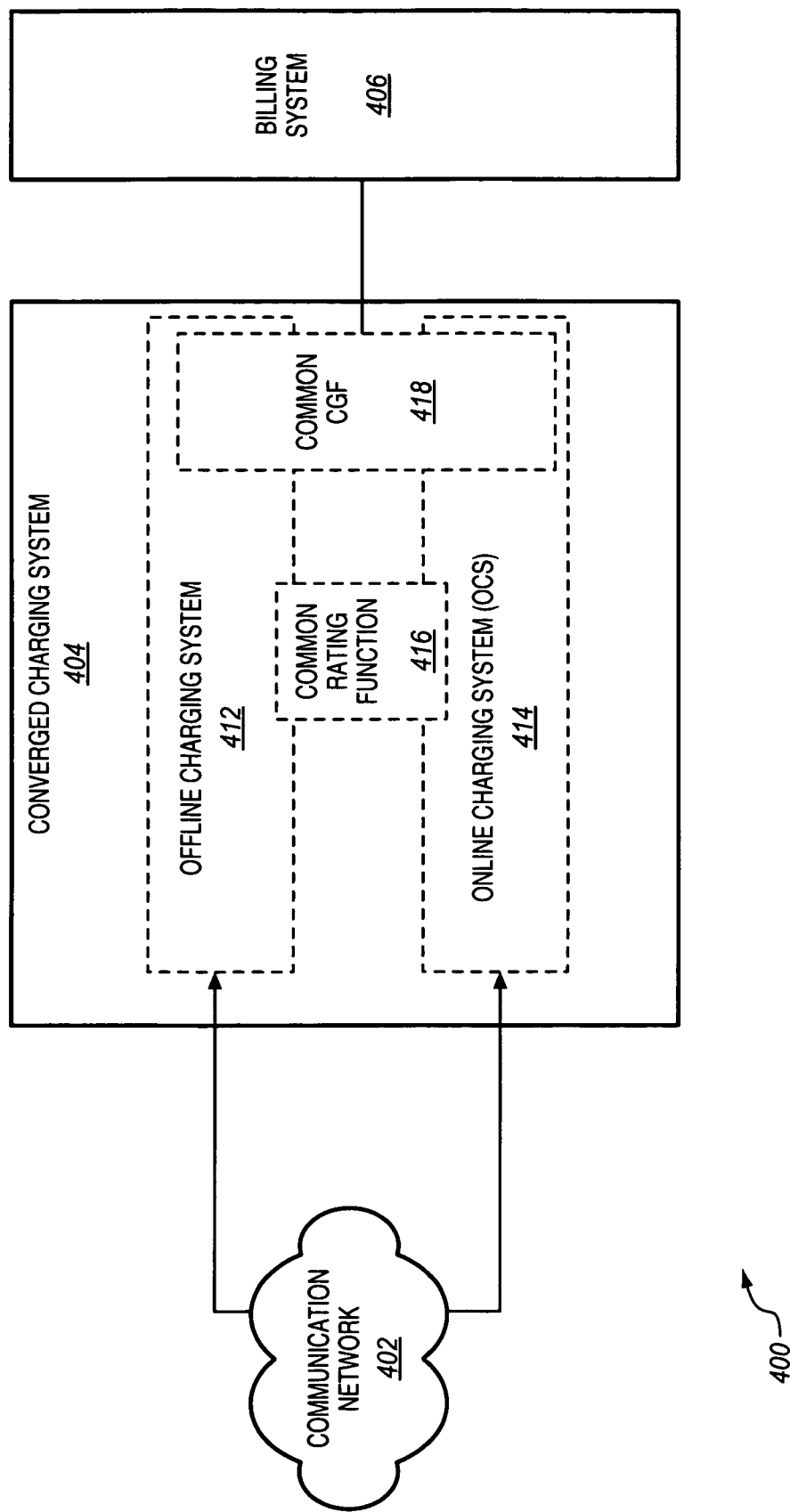
FIG. 4 illustrates a communication system in an exemplary embodiment of the invention.

FIG. 4 illustrates a communication system 400 in an exemplary embodiment of the invention. Communication system 400 includes a communication network 402, a converged charging system 404, and a billing system 406. Communication network 402 may include any desired network domain (i.e., a circuit switching network domain, a packet switching network domain, or a wireless domain), IP multimedia subsystems, and/or emerging 3G application services. Billing system 406 comprises any system or server that provides billing for calls or call-related services. Billing system 406 may be defined by the 3GPP or any subsequent standards body. Communication system 400 may include other systems, servers, or components not shown in FIG. 4.

Converged charging system 404 includes an offline charging system 412, an online charging system (OCS) 414, a common rating function 416, and a common charging gateway function (CGF) 418. Common rating function 416 comprises any function, application, or system that performs non-monetary and/or monetary unit determination for voice and/or data services. Common rating function 416 may provide the following functionalities: rating for network and external services and applications (session, service, or event) before and after service delivery, and cross-product and cross-channel discounts, benefits, and/or allowances. Common rating function 416 is accessible to offline charging system 412 and online charging system 414 either directly or indirectly.

Common charging gateway function 418 comprises any function, application, or system that acts as a gateway between the communication network 402 and the billing system 406 to provide the CDR pre-processing functionality. Common charging gateway function 418 is accessible to offline charging system 412 and online charging system 414.

Common rating function 416 and common charging gateway function 418 may operate on the same or different platforms. As an example, common rating function 416 may operate on the platform of the online charging system 414 while common charging gateway function 418 operates on a separate platform. Common rating function 416 may be considered part of online charging system 414 as defined by the 3GPP, but common rating function 416 is shown as a separate function for ease of description.

Any or all of offline charging system 412, online charging system 414, common rating function 416, and common charging gateway function 418 may comprise instructions executable by a processing system. Some examples of instructions are software, program code, and firmware. The instructions are operational when executed by the processing system to direct the processing system to operate in accord with the invention. The term "processing system" refers to a single processing device or a group of inter-operational processing devices. Some examples of processors are computers, integrated circuits, and logic circuitry.

Figure 5:
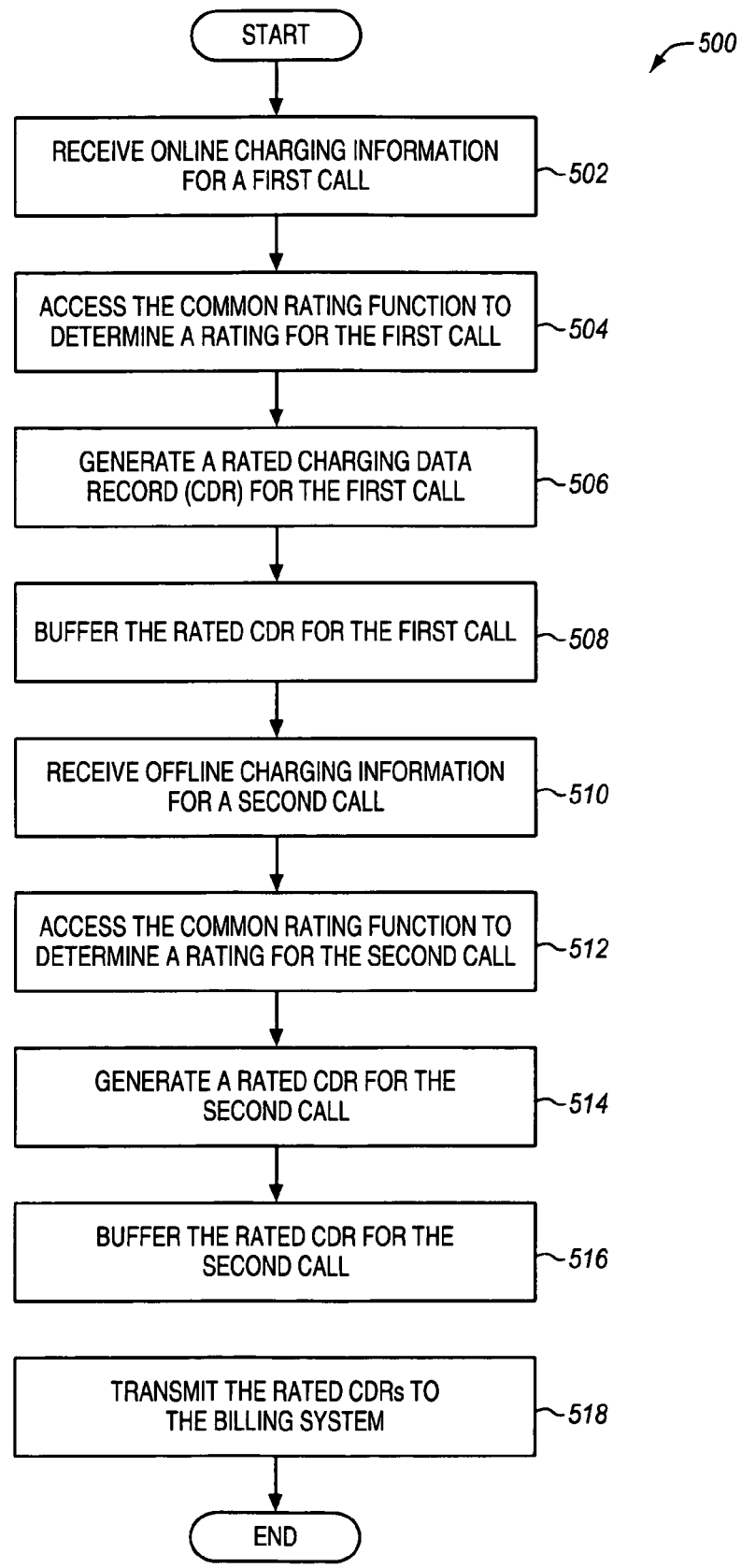
FIG. 5 is a flow chart illustrating a method of operating a converged charging system in an exemplary embodiment of the invention.

FIG. 5 is a flow chart illustrating a method 500 of operating the converged charging system 404 of FIG. 4 in an exemplary embodiment of the invention. Method 500 may not be all-inclusive, and additional steps may be included.

In step 502, online charging system 414 receives online charging information for a first call. Online charging system 414 receives the online charging information from a charging trigger function operating on a node (not shown) handling the first call in communication network 402.

In step 504, online charging system 414 accesses common rating function 416 to determine a rating for the first call. To access common rating function 416, online charging system 414 may transmit a rate request to common rating function 416. Upon receipt of the rate request (price or tariff request) from online charging system 414, the common rating function 416 may evaluate the request. The rate request may include various rating parameters, such as a service identifier, a subscriber reference, network identification, user location, service usage time, transferred data volume, etc. Common rating function 416 determines the applicable price or tariff model (referred to generally herein as a rating), and transmits the rating to online charging system 414.

In step 506, online charging system 414 generates a rated charging data record (CDR) for the first call based on the online charging information and the rating for the first call as provided by common rating function 416. Online charging system 414 transmits the rated CDR to common charging gateway function 418. In step 508, common charging gateway function 418 buffers the rated CDR for the first call.

In step 510, offline charging system 412 receives offline charging information for a second call. Offline charging system 412 receives the offline charging information from a charging trigger function operating on a node (not shown) handling the second call in communication network 402.

In step 512, one of offline charging system 412 or online charging system 414 accesses common rating function 416 to determine a rating for the second call. In step 514, one of offline charging system 412 or online charging system 414 generates a rated CDR for the second call based on the offline charging information and the rating for the second call, and transmits the rated CDR to common charging gateway function 418. In step 516, common charging gateway function 418 buffers the rated CDR for the second call.

Steps 512 and 514 may be performed by offline charging system 412 or online charging system 414. In one embodiment, offline charging system 412 may access common rating function 416 in a similar manner as described above for online charging system 414. Offline charging system 412 then generates the rated CDR for the second call. In an alternative embodiment, offline charging system 412 may not directly access common rating function 416. Offline charging system 412 may transmit the offline charging information for the second call to the online charging system 414 (directly or through common charging gateway function 418). Online charging system 414 may then access common rating function 416 on behalf of offline charging system 412 to generate a rated CDR for the second call.

For offline rating, offline charging system 412 or charging gateway function 418 may instruct the online charging system 414 to rate the call in a near or non-real time manner, such as during an off-peak time. Also, online charging system 414 may not respond with rating information to offline charging system 412 or charging gateway function 418 immediately if it is a peak traffic time.

In step 518, common charging gateway function 418 transmits the rated CDRs to billing system 406. Common charging gateway function 418 may transmit the rated CDRs to billing system 406 periodically or responsive to a request from billing system 406.

Advantageously, the billing system 406 doesn't need to maintain a separate rating function to calculate call charges for offline calls. The converged charging system 404 is used for both online and offline calls, thus achieving charging convergence, which reduces service provider investment, operation, and maintenance cost, and enhances end user service experience. The billing system 406 is only required to store a billing database in order to generate monthly invoices, statistical reports, etc.

Figure 6:
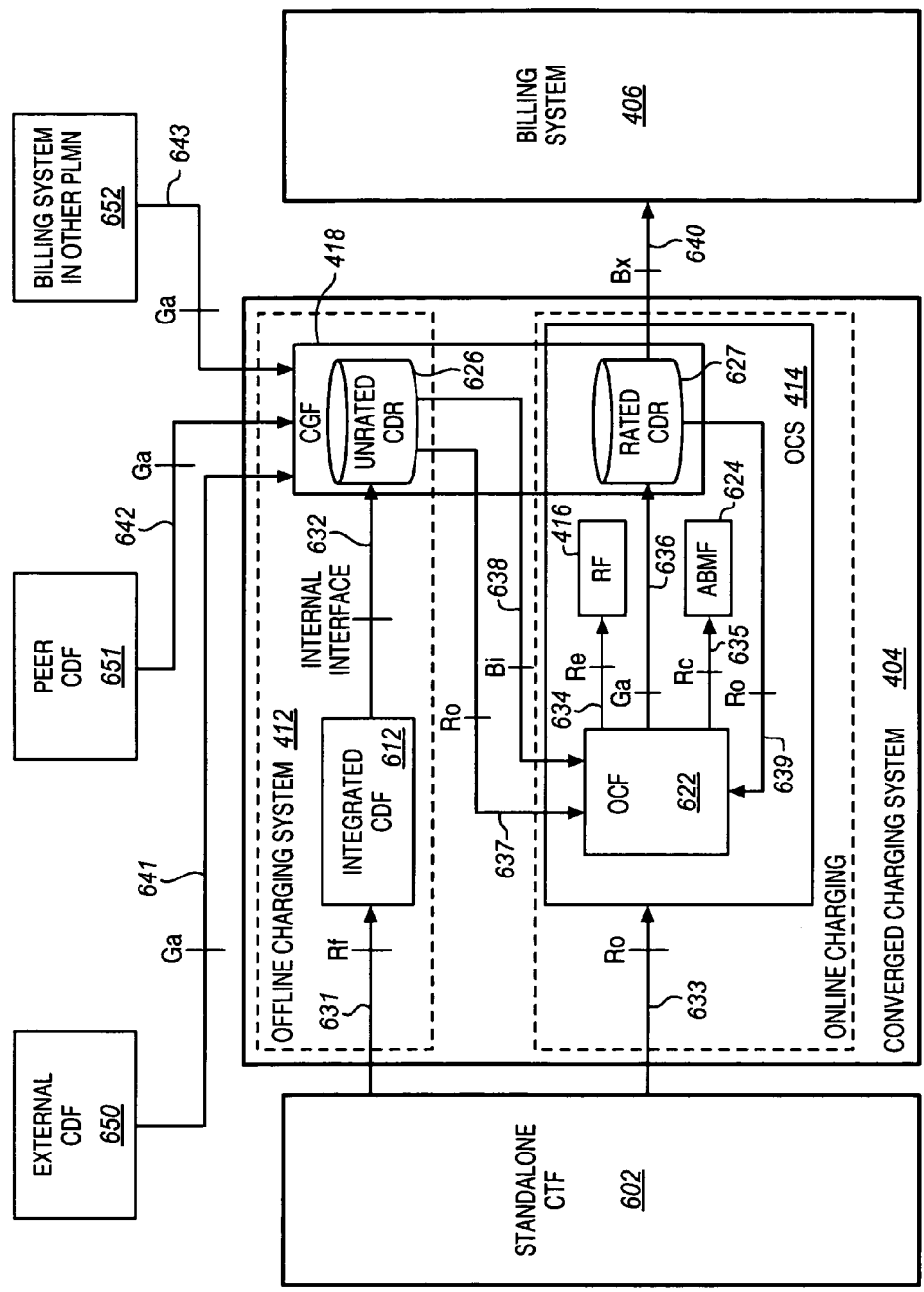
FIG. 6 illustrates a communication system in another exemplary embodiment of the invention.

FIG. 6 illustrates a communication system 600 in another exemplary embodiment of the invention. Communication system 600 as illustrated in FIG. 6 is just one embodiment, and the invention is not limited to this embodiment. As in FIG. 4, converged charging system 404 again includes offline charging system 412, online charging system (OCS) 414, common rating function 416, and common charging gateway function 418.

In this embodiment, offline charging system 412 includes an integrated charging data function (CDF) 612. Charging data function 612 is connected to a charging trigger function (CTF) 602 via an Rf interface 631. Charging data function 612 is also connected to common charging gateway function 418 by an internal interface 632.

Online charging system 414 includes an online charging function (OCF) 622, common rating function (RF) 416, and an account balance management function (ABMF) 624. Online charging system 414 is connected to a charging trigger function 602 via an Ro interface 633. Online charging function 622 is connected to common rating function 416 via an Re interface 634. Online charging function 622 is connected to account balance management function 624 via an Rc interface 635. Online charging function 622 is connected to common charging gateway function 418 via a Ga interface 636.

Common charging gateway function 418 includes an unrated CDR buffer 626 and a rated CDR buffer 627. Unrated CDR buffer 626 is connected to online charging function 622 via an Ro interface 637. Unrated CDR buffer 626 is also connected to online charging function 622 via a Bi interface 638. Rated CDR buffer 627 is coupled to online charging function 622 via an Ro interface 639. Common charging gateway function 418 is connected to billing system 406 via a Bx interface 640.

Charging gateway function 418 is further connected to an external charging data function (CDF) 650 via a Ga interface 641. Charging gateway function 418 is further connected to one or more peer charging gateway functions (CGF) 651 via a Ga interface 642. Charging gateway function 418 is further connected to another billing system in another Public Land Mobile Network (PLMN) 652 via a Ga interface 643.

In communication system 600, charging gateway function 418 is operable to accept CDRs from various network nodes. The following summarizes the messaging cases to accept CDRs into CGF 418 from these network nodes. First, charging gateway function 418 receives CDRs from charging data function 612 that is integrated with charging gateway function 418 in a collocated way. Charging gateway function 418 has integrated the internal charging data function in the collocated way, and has internal interface 632 to accept the CDRs from the integrated charging data function 612.

Secondly, charging gateway function 418 receives CDRs from external charging data function 650. The node having the external charging data function 650 can be located in a separate node in the charging domain.

Third, charging gateway function 418 receives CDRs from peer charging gateway function 651. A pair of peer charging gateway functions 418, 651 can communicate with Ga interface 642 to avoid duplicated CDRs flowing into the billing domain. For fault recovery and redundancy, a charging data function, such as charging data function 612, can connect to a pair of peer charging gateway functions 418, 651. When the primary charging gateway function 418 for that charging data function 612 fails, the charging data function 612 can transmit duplicated CDRs to the secondary charging gateway function 651. When the primary charging gateway function 418 has recovered, the secondary charging gateway function 651 can transmit the duplicated CDRs to the primary charging gateway function 418 via Ga interface 642.

Fourth, charging gateway function 418 receives CDRs from online charging function 622. After charging and rating is performed in online charging function 622, online charging function 622 generates rated CDRs. Online charging function 622 transmits the rated CDRs to charging gateway function 418 via Ga interface 636, where charging gateway function 418 temporarily buffers or stores the rated CDRs.

Fifth, charging gateway function 418 receives CDRs from another billing system 652 in a foreign PLMN. For a subscriber roaming into foreign PLMNs, the CDRs processed by the billing system 652 in the foreign networks need to be re-rated by the home network. Charging gateway function 418 can work with the other billing system 652 to accept the CDRs via Ga interface 643.

Figure 1:
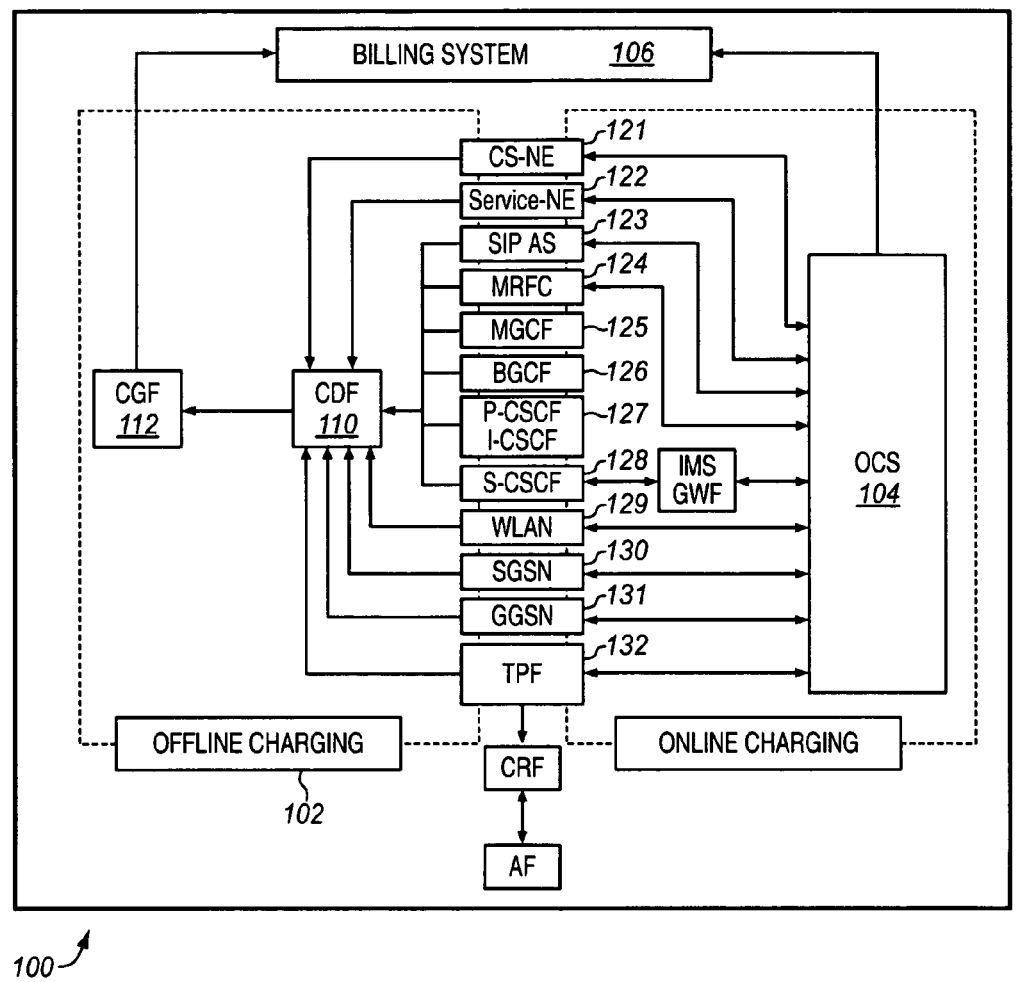
FIG. 1 illustrates a charging architecture as defined by the 3GPP in the prior art.
Figure 2:
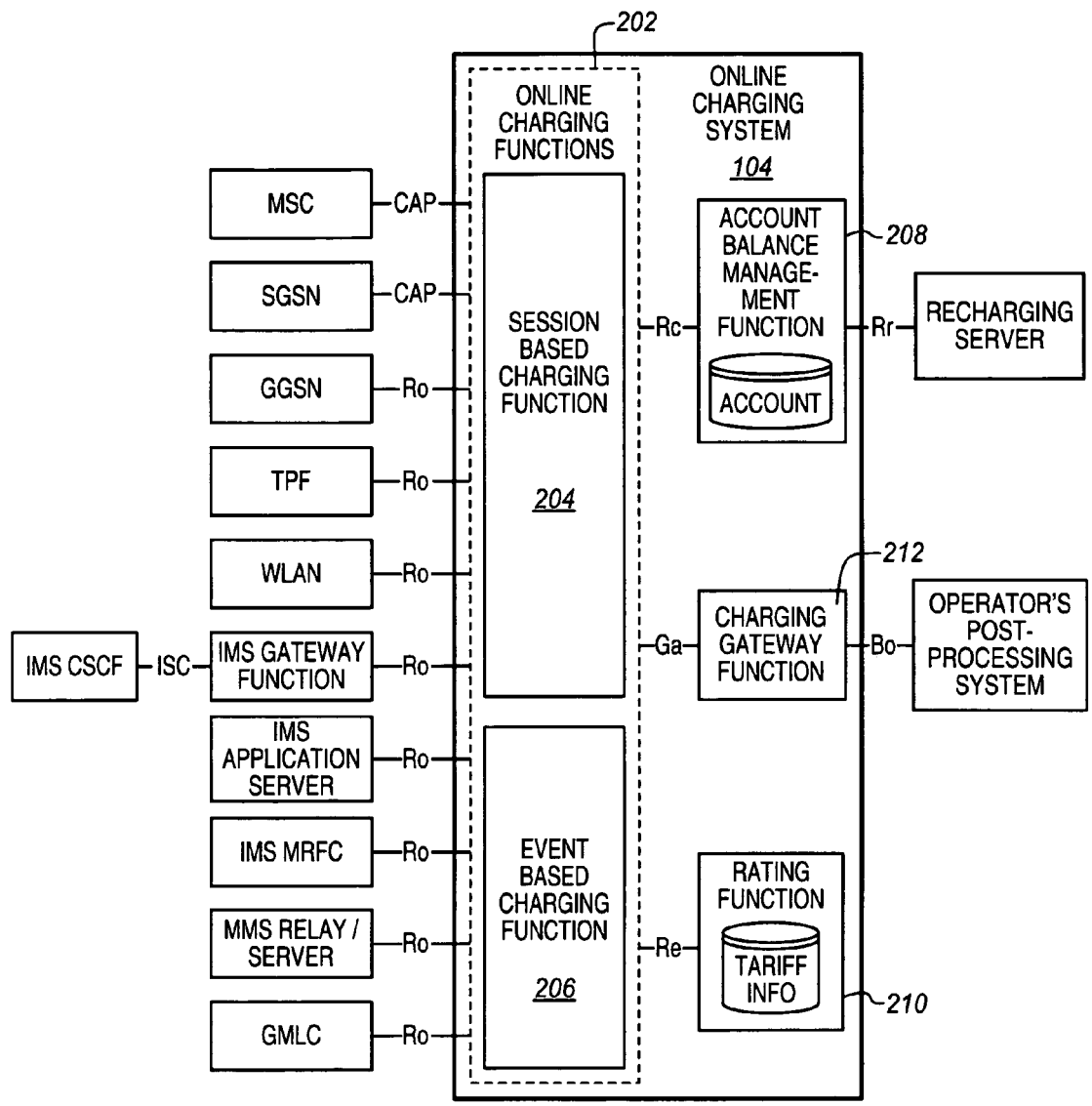
FIG. 2 illustrates an online charging system as defined by the 3GPP in the prior art.
Figure 3:
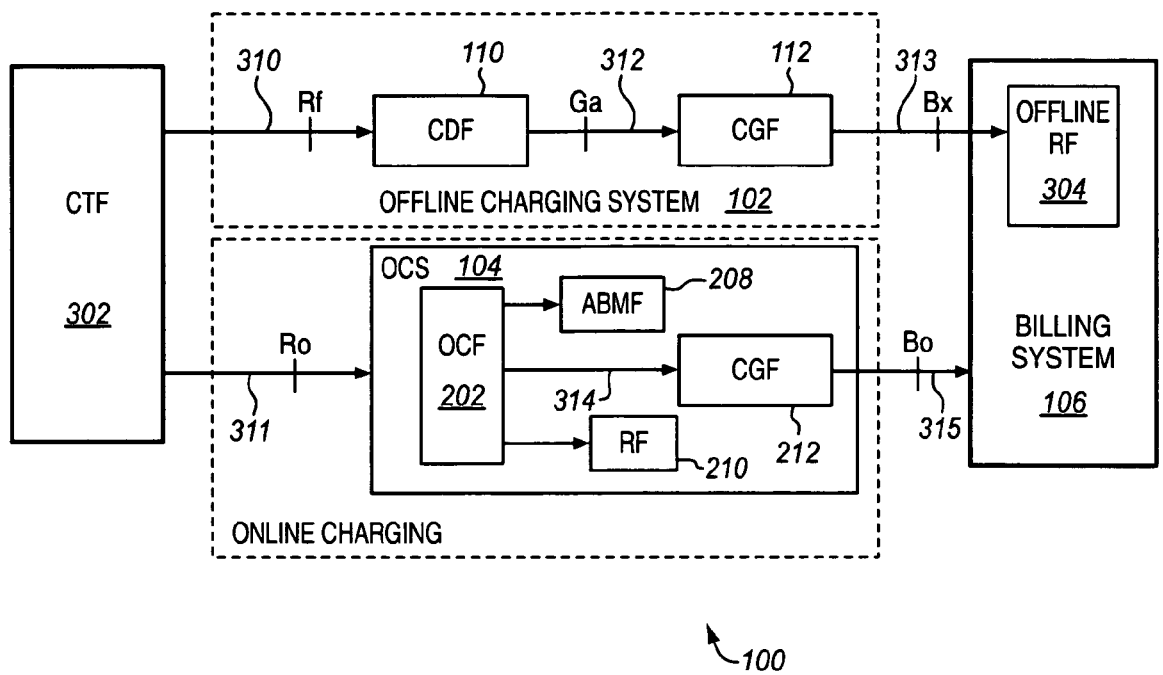
FIG. 3 illustrates a generalization of a charging architecture as defined by the 3GPP to show the operation of the charging architecture in the prior art.

In addition to the above information flows that enable charging gateway function 418 to act a temporary repository to store the CDRs generated from various networks, this invention also introduces the Ro interface 637 and the Bi interface 638 between charging gateway function 418 and online charging system 414 to achieve the converged charging system 404 by using the common rating function 416 in online charging system 414. As opposed to the prior art where the offline rating function was in the billing system (see FIG. 3), the offline rating function is merged into a common rating function 416 in online charging system 414 for both online rating and offline rating needs.

For an offline call that allows for non-real-time charging with latency, charging gateway function 418 generates an unrated CDR without immediately including the charge information. Rating function 416 is accessed to calculate the call charge in batch-processing mode via Bi interface 638 only when that rating function 416 is not busy in calculating charge for an online billing call. Online charging system 414 acts as a client to send a Bi request to charging gateway function 418 for the unrated CDRs. Charging gateway function 418 works as a server in pull mode to accept the Bi request and feed the unrated CDRs to online charging system 414 in a Bi response. Online charging system 414 then accesses common rating function 416 to determine charges for the unrated CDRs, and generates rated CDRs. Online charging system 414 then transmits the rated CDRs to charging gateway function 418 via Ga interface 636.

For an offline call that allows for non-real-time charging with latency, charging gateway function 418 generates an unrated CDR without immediately including the charge information. Rating function 416 is accessed to calculate the call charge in batch-processing mode via Bi interface 638 only when that rating function 416 is not busy in calculating charge for an online billing call. Online charging system 622 acts as a client to send a Bi request to charging gateway function 418 for the unrated CDRs. Charging gateway function 418 works as a server in pull mode to accept the Bi request and feed the unrated CDRs to online charging system 622 in a Bi response. Online charging system 414 then accesses common rating function 416 to determine charges for the unrated CDRs, and generates rated CDRs. Online charging system 414 then transmits the rated CDRs to charging gateway function 418 via Ga interface 636.

For an online call, common rating function 416 is consulted immediately to determine the charge on the call. Online charging system 414 works as a server to accept the online charging information from charging trigger function (CTF) 602 via Ro interface 633. Online charging system 414 then accesses common rating function 416 to determine charges for the online call, and generates a rated CDR for the call. Online charging system 414 then transmits the rated CDR to charging gateway function 418 via Ga interface 636.

For the rated CDRs that require re-rating based on the operator's charging policy, the common rating function 416 is consulted to calculate the call charge in via Ro interface 639. Charging gateway function 418 acts as a client in push mode to transmit a rated CDR in an Ro request to online charging system 414. Online charging system 414 works as a server to accept the Ro request and to transmit an Ro response to charging gateway function 418 to confirm the successful CDR reception. Online charging system 414 then accesses common rating function 416 to determine re-rate charges for the rated CDR, and generates a re-rated CDR. Online charging system 414 then transmits the re-rated CDR to charging gateway function 418 via Ga interface 636.

After the online or offline calls are rated by the converged charging system 404, the CDRs with call cost are stored in the charging gateway function 418. The CDRs are then pulled to billing system 406 via Bx interface 640 for statistical report generation, invoice generation, etc.

Figure 7:
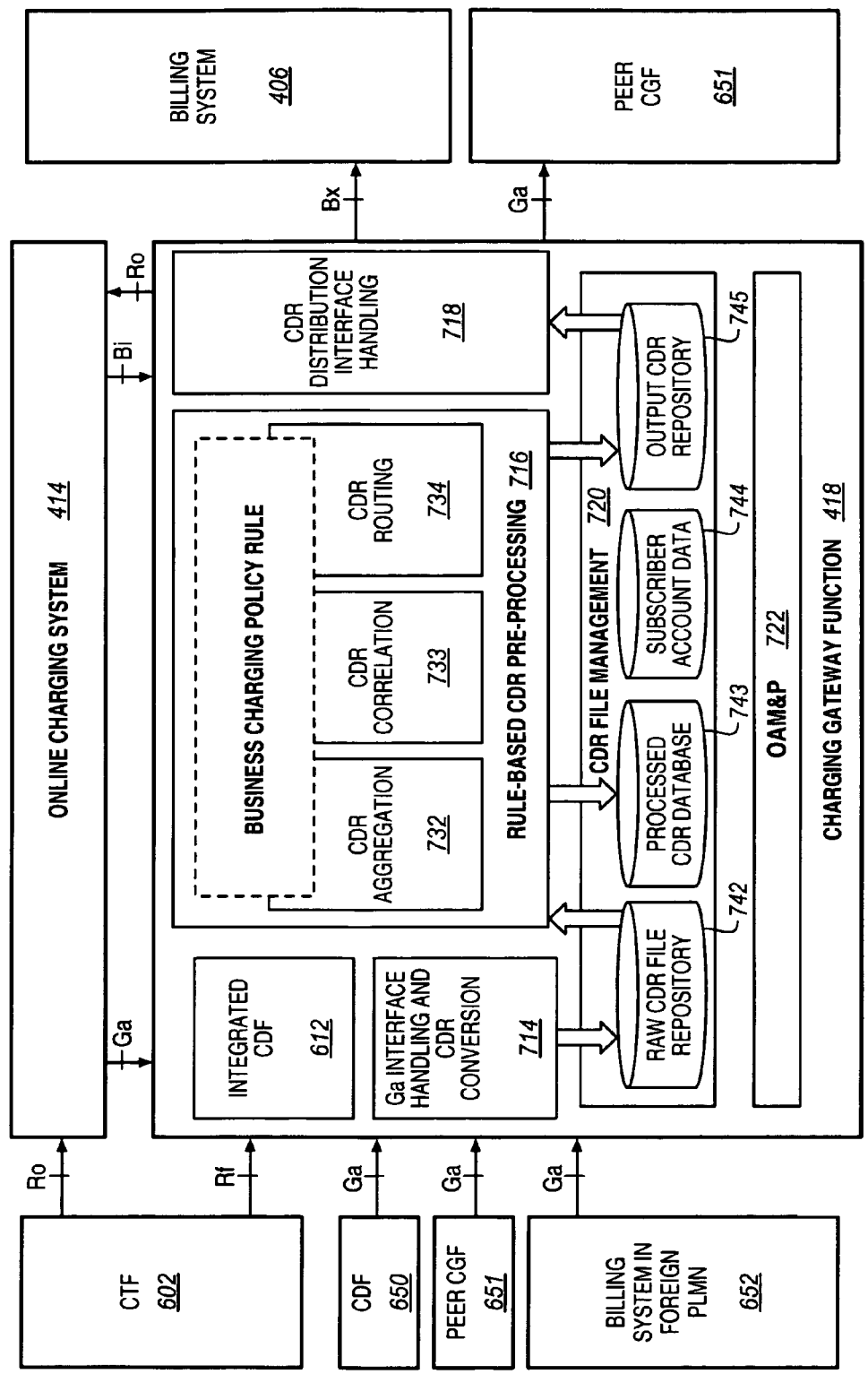
FIG. 7 illustrates one possible architecture of a charging gateway function in an exemplary embodiment of the invention.

FIG. 7 illustrates one possible architecture of charging gateway function 418 in an exemplary embodiment of the invention. In this embodiment, charging gateway function 418 includes integrated charging data function 612, a Ga interface handling and CDR conversion function 714, CDR pre-processing functions 716, CDR distribution interface handling function 718, a CDR file management function 720, and an Operation, Administration, Maintenance and Provision (OAM&P) function 722. CDR pre-processing function 716 include a CDR aggregation function 732, a CDR correlation function 733, and a CDR routing function 734. CDR file management function 720 includes a raw CDR file repository 742, a processed CDR database 743, a subscriber account database 744, and an output CDR repository 745.

Ga interface handling and CDR conversion function 714 handles the Ga interface for CDR acceptance from the various network nodes (such as charging data function 650, peer charging gateway function 651, and billing system 652 in a foreign network) for normal CDR transferring and duplicated CDRs transferring. Function 714 supports a redirection mechanism via Ga interface to redirect the CDRs in its own node to peer charging gateway function 651. Function 714 also supports an advertise mechanism via Ga interface to notify its CDR transfer capability (e.g., service downtime, service bring-up time, etc). Function 714 supports the different CDR encoding format (such as ANS.1 BER (Basic Encoding Rules), PER (unaligned or aligned Packet Encoding Rules), AMA, IPDR, XML, etc), and performs the re-format CDR conversion into a unified ASN.1 BER CDR format. Each re-formatted CDR will be compared with the CDR semantic and syntax definition based on CDR validation rules before it is stored in raw CDR repository for further CDR pre-processing. If a received CDR field or value from a node type (such as CSCF, MRFC, etc) breaks the validation rules, based on CDR field category (such as mandatory, conditional, operator mandatory or operator conditional), function 714 recovers the bad-format CDR filled with an appropriate "replacement" indicator within the limits of the syntax allowed for the parameter. For the normal CDR transfer via Ga interface (i.e., Ga request type is "Data Record Transfer Request: Send Data Record Packet"), the recoverable is stored in normal acceptable CDRs. For the possibly duplicated CDR transfer via Ga interface for redundancy handling purpose (i.e., Ga request type is "Data Record Transfer Request: Send possibly duplicated Data record transfer request"), the possibly duplicated CDR is stored into a separated raw CDR file repository 742. When the peer charging gateway function 651 is recovered from failure, the function 714 will get an indication from charging data function 612 to transmit the duplicated CDR to the peer charging gateway function 651 via Ga interface. Any un-recoverable CDRs, which are considered non-acceptable by charging gateway function 418, are stored in un-recoverable CDRs repository for operator manual operation.

Figure 8:
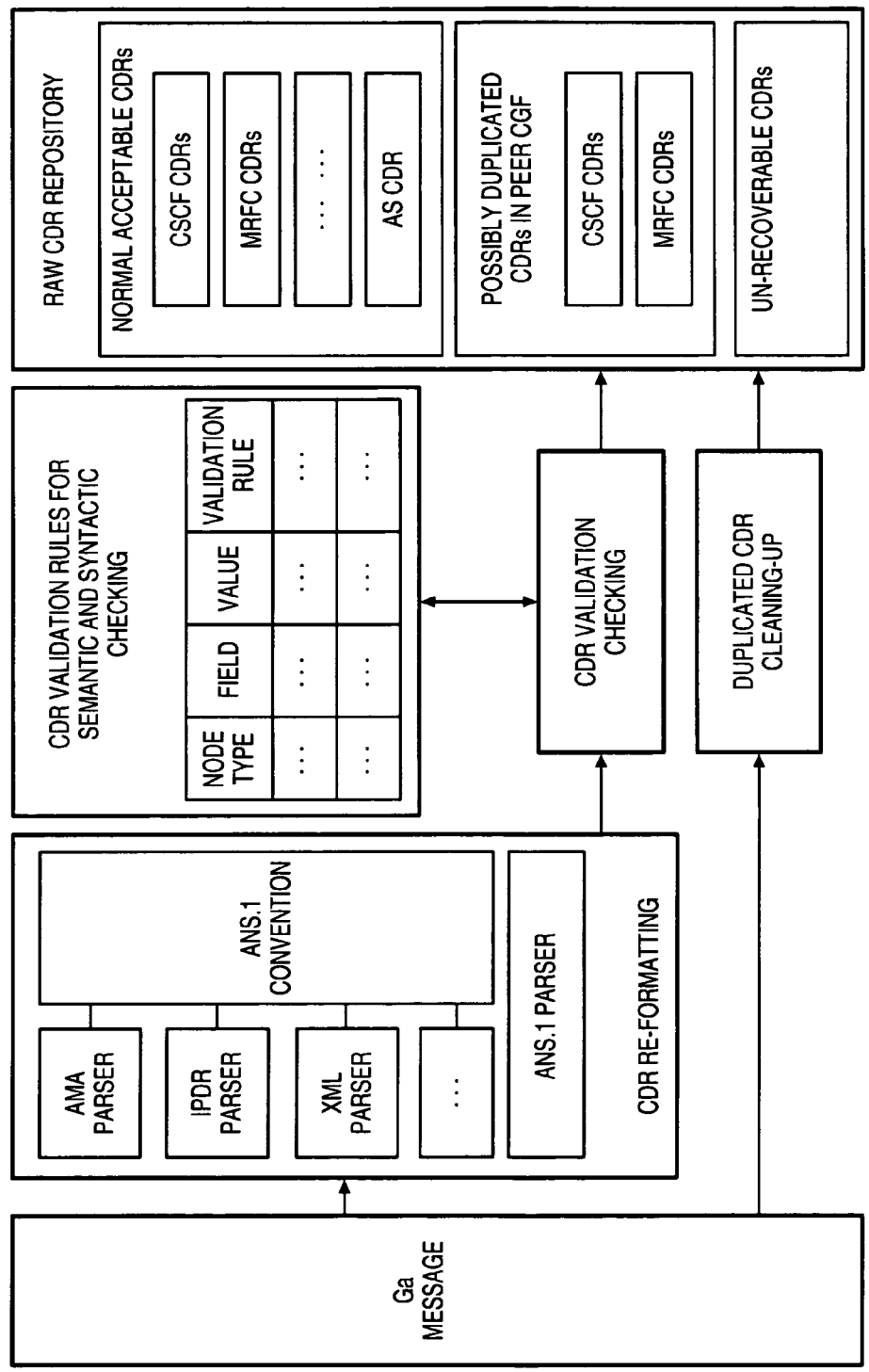
FIG. 8 illustrates the work flow for the Ga interface handling and CDR conversion function in an exemplary embodiment of the invention.

Function 714 supports the duplicated CDR clean-up functionality to remove the possibly duplicated CDR from the charging gateway function 418 when peer charging gateway function 651 is recovered into the normal condition to accept the CDRs via Ga interface (i.e., Ga request type is "Data Record Transfer Request: Sequence Number of Released Packets or Sequence Number for Canceled Packets"). FIG. 8 illustrates the work flow for the Ga interface handling and CDR conversion function 714 in an exemplary embodiment of the invention.

In FIG. 7, integrated charging data function (CDF) 612 directly accepts Rf interface requests from CTF 602. Integrated charging data function 612 directly generates a CDR and transmits the CDR to the raw CDR file repository 742 to avoid the charging gateway function 418 and charging data function Ga traffic overload.

Figure 9:
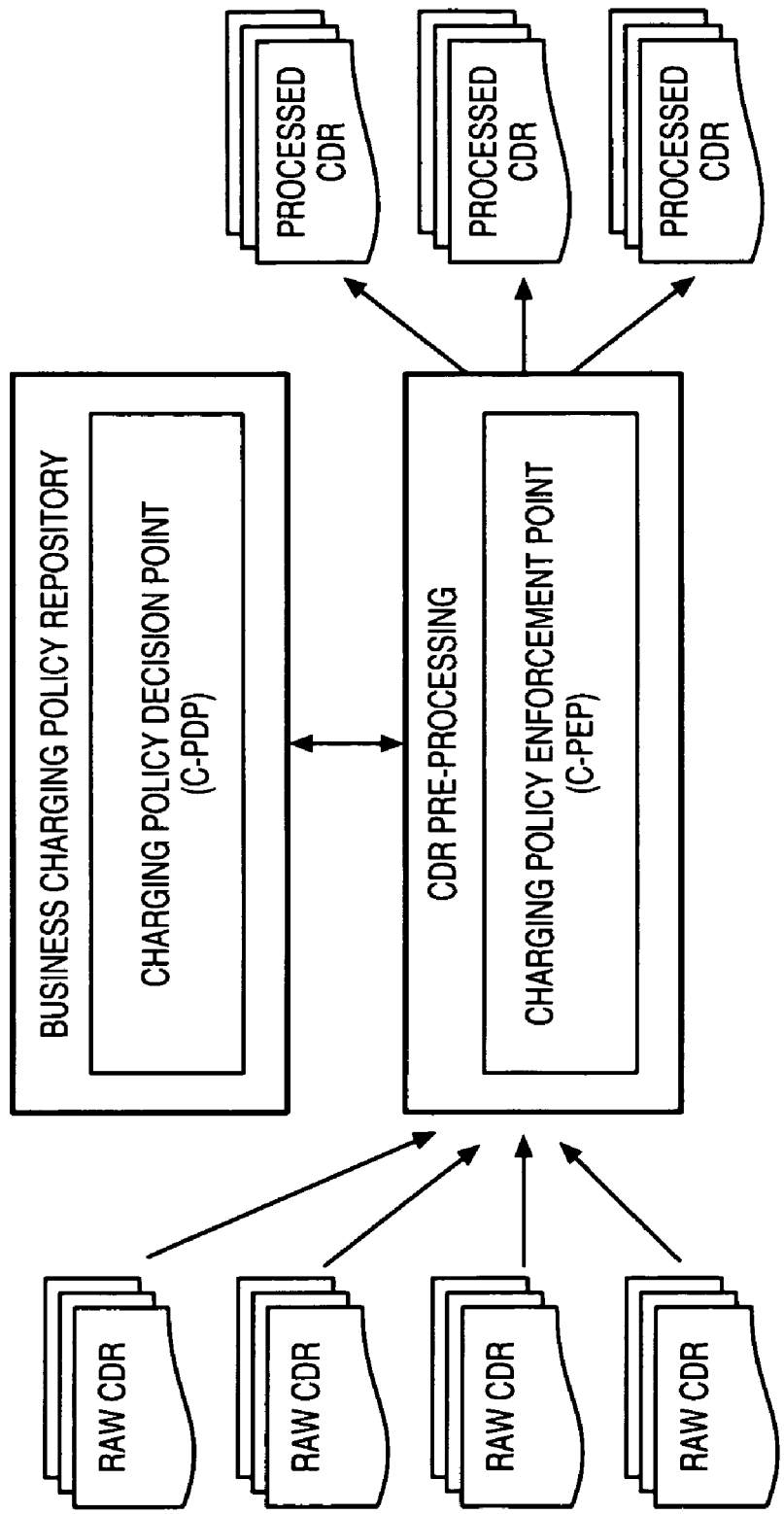
FIG. 9 illustrates rule-based CDR pre-processing in a CDR pre-processing function in an exemplary embodiment of the invention.

FIG. 9 illustrates rule-based CDR pre-processing in CDR pre-processing function 716 in an exemplary embodiment of the invention. CDR pre-processing function 716 enables the operator to define the pre-processing business rule for CDR aggregation, correlation, and filtering. The policy-based CDR processing provides the operator with rapid introduction and modification of new policies to reflect the charging market condition to adapt the new and as yet unforeseen business modes or charging schemes. The abstract CDR pre-processing is defined as the following:

IF CDR Pre-Processing Condition List
    THEN
       Sequence of Actions
    END The CDR pre-process condition can be CDR parameters (such as CDR Type, Charging ID, Session ID, GGSN Address, Subscriber IMSI, etc) or CDR sending node address (such as charging trigger function, charging data function, billing system, online charging system, etc). The condition list is constructed by a list of conditions linked by BOOL operator AND, OR, and NOT in conjunctive normal form (CNF). When a rule is invoked by a charging policy enforcement point (PEP), the rule condition is evaluated in a charging policy decision point (PDP). If the rule condition is matched, all actions under the rule are executed in the order.

Figure 10:
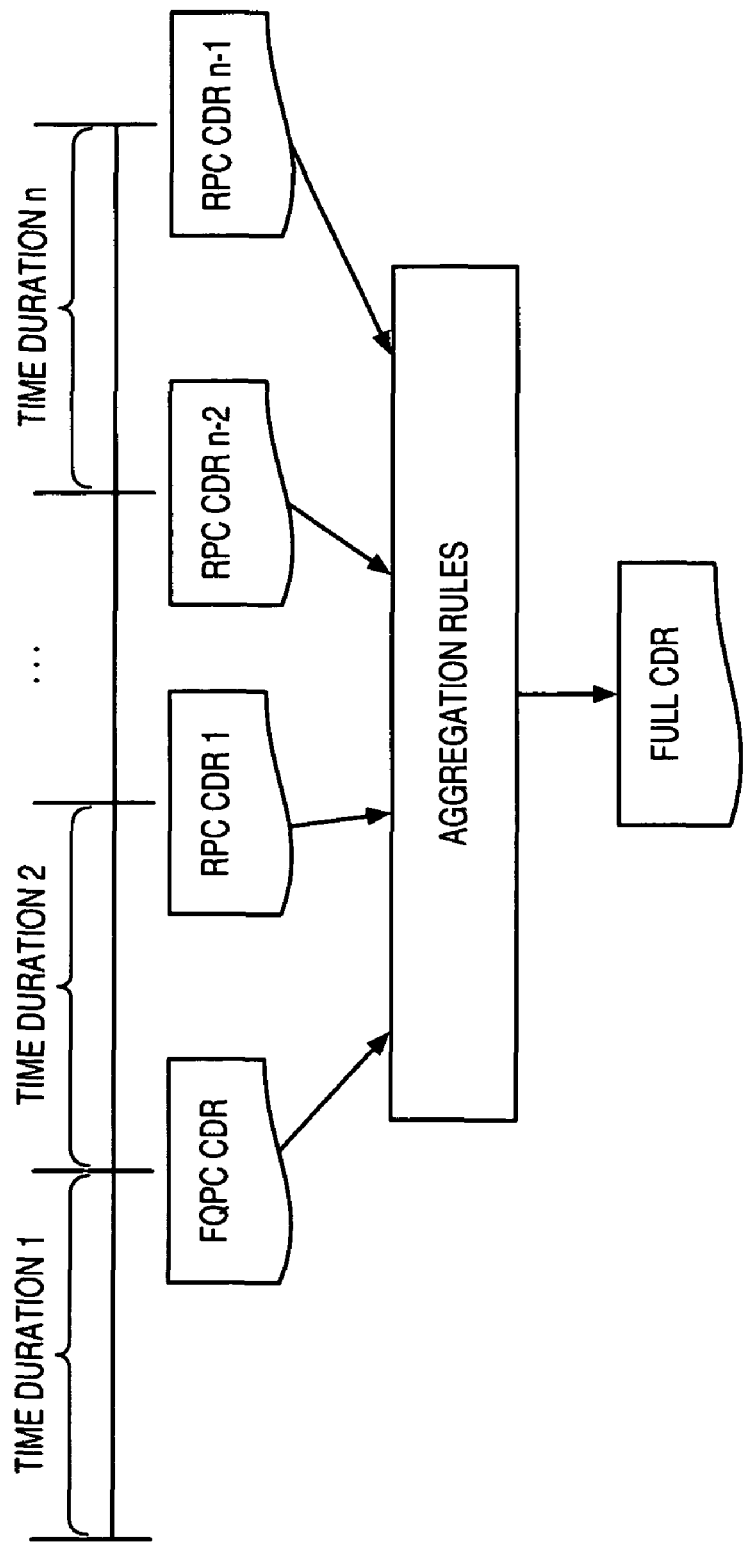
FIG. 10 illustrates CDR aggregation in an exemplary embodiment of the invention.

FIG. 10 illustrates CDR aggregation in an exemplary embodiment of the invention. CDR aggregation function 732 (see FIG. 7) enables the merging of multiple CDRs into one CDR from one same CDR node based the important CDR key selection. The aggregation rule condition is based on the important CDR parameter selection.

For example, in the IMS charging domain, a long session controlled by S-CSCF may be covered by several partial CDRs due to charging tariff switching, location change, or QoS change. The first CDR is generated as Fully Qualified Partial CDR (FQPC), which contains a complete set of the fields specified for the CSCF CDR type. The second partial CDR or subsequent partial CDR is generated as Reduced Partial CDR (RPC), which only provides mandatory fields and information regarding changes in the session parameters relative to the previous partial CDR. The CDR aggregation can merge a set of partial CDRs of the session within the same CDR node into a full CDR based on the session key information (such as a SIP Session ID, a S-CSCF Address, etc).

Figure 11:
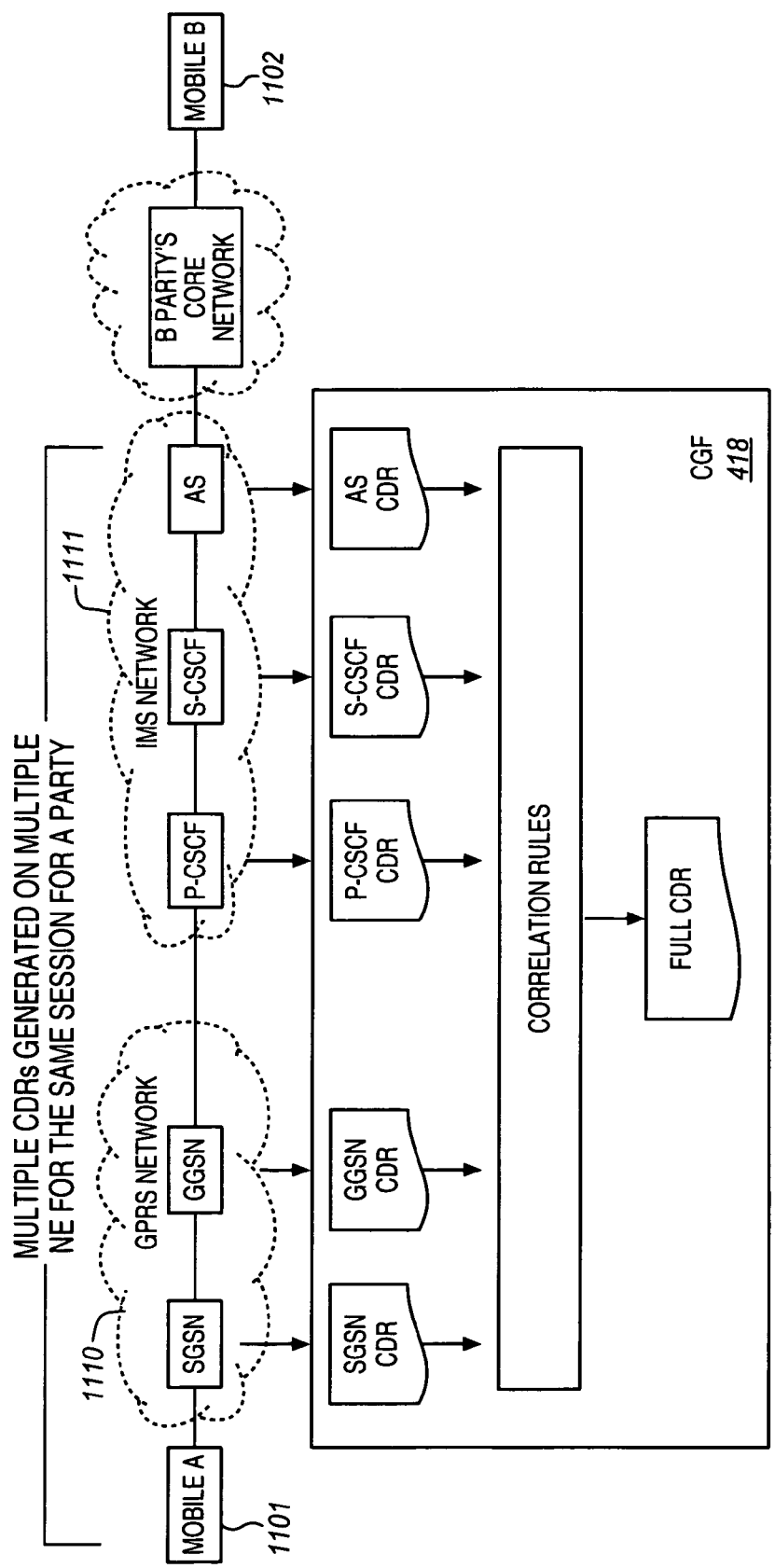
FIG. 11 illustrates CDR correlation in an exemplary embodiment of the invention.

FIG. 11 illustrates CDR correlation in an exemplary embodiment of the invention. CDR correlation function 733 (see FIG. 7) analyzes the multiple charging level relationships (i.e., bearer level, subsystem level, and application service level) within one data session. The CDR correlation function 733 also integrates the multiple CDRs from several network element that generates CDRs (such as SGSN-CDR, GGSN-CDR, P-CSCF CDR, S-CSCF CDR, AS CDRs) for the same session into one CDR. The correlation rule condition is based on the important CDR parameter selection.

For the example illustrated in FIG. 11, a subscriber A (mobile A) 1101 places a call to a subscriber B (mobile B) 1102. Subscriber A 1101 accesses the GPRS network 1110, which connects with the IMS network 1111 to communicate with subscriber B 1102. The CDRs generated in the GPRS network 1110 includes SGSN-CDR and GGSN CDR. The CDRs generated in the IMS network 1111 includes Proxy-CSCF CDR, Serving-CSCF CDR, and Application Server CDR. Subscriber A's CDRs generated in the GPRS network 1110 can be correlated by a Subscriber ID, a GPRS Charging ID, and a GGSN Address. The CDRs generated at the IMS network 1111 can be correlated by a Subscriber ID, an IMS Charging Identifier, an Inter-Operator Identifier, and an Application Charging ID. The CDRs in the GPRS network 1110 and the CDRs in the IMS network 1111 for the same packet data session can be correlated with a GGSN address, an IMS Charging ID, and an Inter Operator Identifier.

Figure 12:
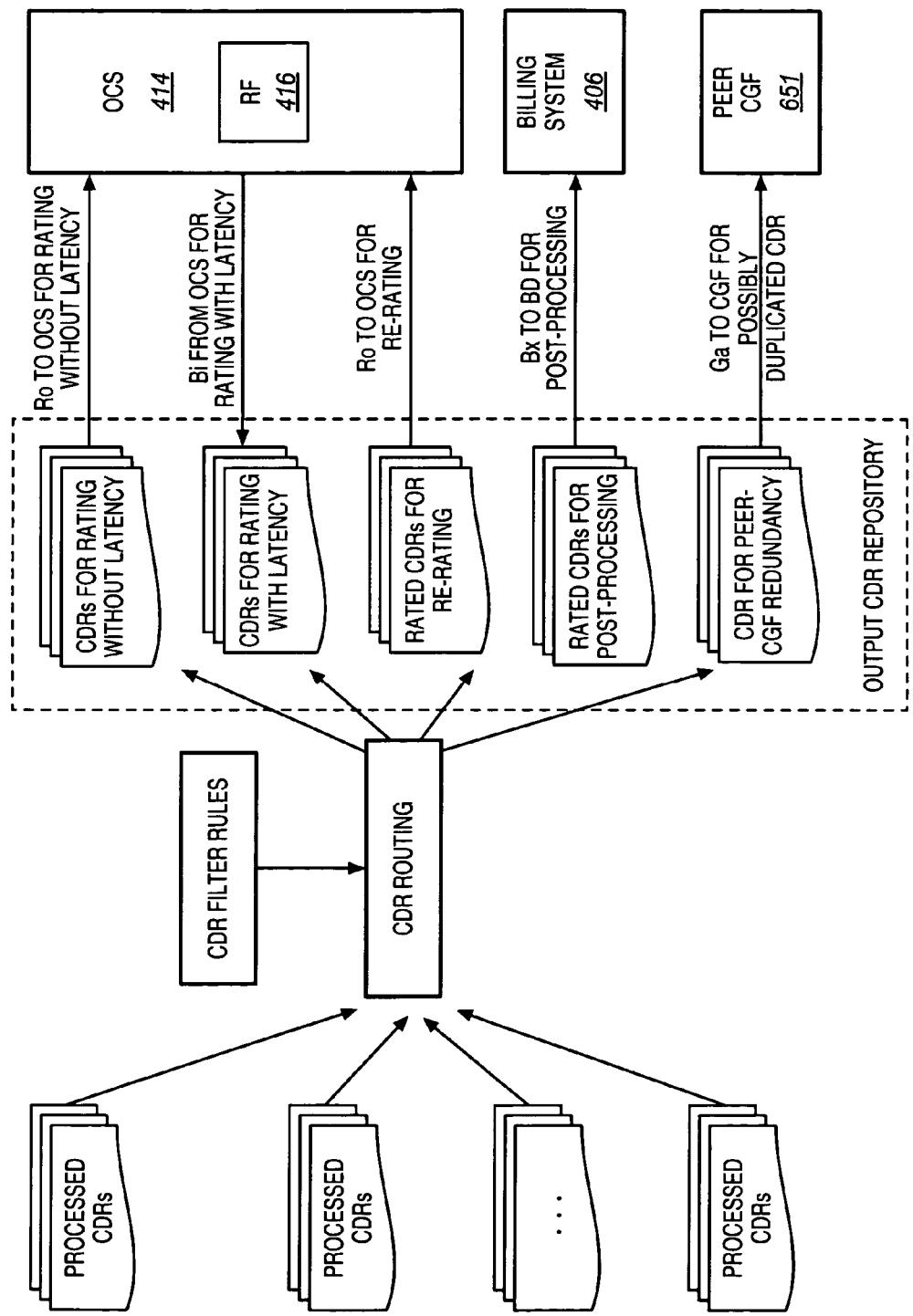
FIG. 12 illustrates CDR routing in an exemplary embodiment of the invention.

FIG. 12 illustrates CDR routing in an exemplary embodiment of the invention. The CDR routing function 735 (see FIG. 7) applies CDR parameters and CDR origin as CDR filter rules to analyze and classify the processed CDR and decides which destination route is appropriate for the CDR for further CDR processing. The CDR routing destination may be based on a CDR for rating without latency via Ro interface 637 to online charging system 414, a CDR for rating with latency via Bi interface 638 to online charging system 414, a CDR for re-rating via Ro interface 639 to online charging system 414, a CDR for post-processing via Bx interface 640 to the billing system 406, or a CDR for redundancy handling via Ga interface 642 to peer charging gateway function 651.

Referring to FIG. 7, CDR distribution interface handling function 718 defines the file transfer triggers to define when to transfer a CDR to the target application. The CDR distribution supports the push and pull CDR transfer mode, which is configured by operator. The CDR distribution supports Ro, Bx, and Ga protocol handling to deliver the CDR to online charging system 414, billing system 406, and peer charging gateway function 651, etc.

CDR file management function 720 defines the CDR file organization, CDR naming convention, file encoding, file data directory management, etc. The CDR file management function 720 enables the operator to define a file closure trigger condition to determine when to close a CDR file and create another CDR file to store the subsequent CDR file. The file close trigger includes a file size limit, a number of CDRs, a file lifetime, an OAM&P action, charging gateway function defined reason, etc. When any of these triggers are matched, the corresponding file shall be closed and the new CDR file shall be generated.

OAM&P function 722 supports system account management for authorization operation, the CDR pre-processing rule provision, CDR file and system configuration management, system performance management, system log and alarm reporting management, system redundancy management for backup and recovery, etc.

We claim:

1. A converged charging system for offline charging and online charging in a communication network, the converged charging system comprising:
   a charging gateway function operable to transmit rated charging data records (CDR) to a billing system;
   an online charging system comprising an online charging function and a rating function, wherein the online charging function is operable to receive online charging information for a first call, to access the rating function to determine a rating for the first call, to generate a rated CDR for the first call based on the online charging information and the rating for the first call, and to transmit the rated CDR for the first call to the charging gateway function; and
   an offline charging system comprising a charging data function, wherein the charging data function is operable to receive offline charging information for a second call, to generate an unrated CDR for the second call based on the offline charging information, and to transmit the unrated CDR for the second call to the charging gateway function;
   wherein the charging gateway function is operable to transmit the unrated CDR for the second call to the online charging function;
   wherein the online charging function is operable to access the rating function to determine a rating for the second call, to generate a rated CDR for the second call based on the unrated CDR for the second call and the rating for the second call, and to transmit the rated CDR for the second call to the charging gateway function.

2. The converged charging system of claim 1 wherein the charging gateway function connects to the billing system over a Diameter Bx interface and is operable to transmit the rated CDR for the first call and the rated CDR for the second call to the billing system via the Bx interface.

3. The converged charging system of claim 2 wherein:
   the charging gateway function includes an unrated CDR buffer that is operable to store the unrated CDR for the second call as received from the offline charging system.

4. The converged charging system of claim 3 wherein:
   the unrated CDR buffer is coupled to the online charging function via a Diameter Ro interface; and
   the charging gateway function is further operable to transmit the unrated CDR for the second call from the unrated CDR buffer to the online charging function in a Diameter Ro request for real-time processing of the unrated CDR.

5. The converged charging system of claim 3 wherein:
   the unrated CDR buffer is coupled to the online charging function via a Diameter Bi interface; and
   the charging gateway function is further operable to transmit the unrated CDR for the second call from the unrated CDR buffer to the online charging function in response to a Diameter Bi request from the online charging function for batch processing of the unrated CDR in non-real-time.

6. The converged charging system of claim 1 wherein:
   the charging gateway function includes a rated CDR buffer that is operable to store the rated CDR for the first call and the rated CDR for the second call; and
   the online charging function is further operable to transmit the rated CDR for the second call to the rated CDR buffer via a Diameter Ga interface.

7. The converged charging system of claim 1 wherein the charging gateway function is further operable to receive CDRs from a peer gateway function via a Diameter Ga interface.

8. The converged charging system of claim 1 wherein the charging gateway function is further operable to receive CDRs from another billing system in another communication network via a Diameter Ga interface.

9. The converged charging system of claim 1 wherein:
the charging gateway function is further operable to transmit a rated CDR for a third call to the online charging function; and
the online charging function is operable to access the rating function to determine a re-rating for the third call, to generate a re-rated CDR for the third call based on the re-rating for the third call, and to transmit the re-rated CDR for the third call to the charging gateway function.

10. The converged charging system of claim 1 wherein the communication network is based on 3GPP standards.

\* \* \* \* \*

UNITED STATES PATENT AND TRADEMARK OFFICE
CERTIFICATE OF CORRECTION

| | | |
|---|---|---|
| PATENT NO. | : 7,940,904 B2 | Page 1 of 1 |
| APPLICATION NO. | : 11/190731 | |
| DATED | : May 10, 2011 | |
| INVENTOR(S) | : Cai et al. | |

It is certified that error appears in the above-identified patent and that said Letters Patent is hereby corrected as shown below:

Col. 8, line 29, insert the following:

-- For an offline call that requires real-time charging without latency, charging gateway function 418 generates an unrated CDR. Charging gateway function 418 transmits the unrated CDR to online charging system 414 via Ro interface 637. Charging gateway function 418 acts as a client in push mode to transmit the unrated CDR in an Ro request to online charging system 414. Online charging system 414 works as a server to accept the Ro request and transmit an Ro response to charging gateway function 418 to confirm the successful CDR reception. Online charging system 414 then accesses common rating function 416 to determine a charge on that call, and generates a rated CDR. Online charging system 414 transmits the rated CDR to charging gateway function 418 via Ga interface 636. When receiving the Ro request from offline charging system 412, online charging system 414 may wait to access common rating function 416 until there is a non-peak processing time, depending on system configurations. Online charging system 414 will handle online charging first, and serve the offline charging during off times. --.

Col. 8, line 45-60, delete.

Signed and Sealed this
Twenty-fifth Day of October, 2011

David J. Kappos
*Director of the United States Patent and Trademark Office*